United States Patent [19]

Fukawa

[11] 4,000,515
[45] Dec. 28, 1976

[54] DEVICE FOR PREVENTING INADVERTENT ERASION OF A TAPE IN A BIDIRECTIONAL RECORDING/REPRODUCING APPARATUS

[75] Inventor: Kazumi Fukawa, Asaka, Japan

[73] Assignee: Copal Company Limited, Tokyo, Japan

[22] Filed: Apr. 15, 1975

[21] Appl. No.: 568,292

[30] Foreign Application Priority Data

Apr. 19, 1974  Japan ............................. 49-43434
Apr. 19, 1974  Japan ............................. 49-43435

[52] U.S. Cl. ................................. 360/60; 360/96
[51] Int. Cl.² .................................... G11B 15/04
[58] Field of Search .................. 360/60, 93–96, 360/105

[56] References Cited
UNITED STATES PATENTS

| 3,586,336 | 6/1971 | Rosenblatt | 360/60 |
| 3,677,556 | 7/1972 | Oosone | 360/60 |
| 3,752,938 | 8/1973 | Ozawa | 360/60 |
| 3,766,327 | 10/1973 | Johnson | 360/60 |

Primary Examiner—Jay P. Lucas
Attorney, Agent, or Firm—Oblon, Fisher, Spivak, McClelland & Maier

[57] ABSTRACT

Device for preventing the inadvertent erasure of a tape in a bi-directionally operable recording/reproducing apparatus for use with a tape cassette having a pair of detecting portions each provided with a removable lug and for the detection in the feeding of the tape in one direction and in the opposite direction, wherein the existence of the lug indicates that the erasure and recording of the tape are allowed while non-existence of the lug indicates that erasion of the tape is inhibited. The device has a pair of actuating levers urged to engage with the respective detecting portions so that each of the actuating levers is positioned in a first position when the detecting portion has a lug, whereas it is positioned in a second position when the detecting portion has no lug. A recording switching plate, which is adapted to be positioned in a first position when the tape is fed in one direction but positioned in a second position when the tape is fed in the opposite direction, is alternately engaged with the respective actuating levers so that either one of the actuating levers is urged to the first position so as to render the same inoperative in sensing the detecting portion which is not to be sensed depending upon the position of the recording switching plate which determines the direction of feeding of the tape. A recording preventing plate, which is coupled with a recording button of the recording/reproducing apparatus and positioned in a first position during a nonrecording operation but moved to a second position when the recording button is actuated for the recording operation, is provided with a pair of abutment portions each being adapted to engage with the respective actuating lever when the recording preventing plate is in its first position and either one of the actuating levers is positioned in the second position by sensing the detecting portion having no lug so as to arrest the recording preventing plate in its first position. Thus, the recording button is prevented from being actuated when the abutment portion of the recording preventing plate engages with the actuating lever positioned in the second position.

4 Claims, 6 Drawing Figures

DEVICE FOR PREVENTING INADVERTENT ERASION OF A TAPE IN A BIDIRECTIONAL RECORDING/REPRODUCING APPARATUS

BACKGROUND OF THE INVENTION

The present invention relates to a device for preventing inadvertent erasure of a tape in a bi-directionally operable magnetic recording/reproducing apparatus.

A tape cassette for use with a cassette type recording/reproducing apparatus is provided with a detecting portion having therein a removable lug. When the detecting portion from which the lug is removed engages with an actuating lever of the recording/reproducing apparatus for sensing the detecting portion, the actuating lever is positioned in a recording preventing position so that the recording mechanism coupled with the actuating lever is rendered inoperative so as to prevent the inadvertent erasure of the information recorded on the tape having been recorded. When the lug remains in the detecting portion, the actuating lever sensing the detecting portion having such a lug is positioned in the recording permitting position so that the recording mechanism is allowed to be rendered operative for recording desired information on the tape.

In a bi-directionally operable recording/reproducing apparatus of the cassette type, the direction of feeding of the tape in the tape cassette is automatically reversed by a reversing mechanism in the apparatus without requiring removing and placing of the cassette in the inverted position after the feeding thereof in one direction has been completed, while the input terminals of the recording/reproducing head are automatically switched so as to permit the recording/reproducing operation to be carried out during the feeding of the tape in one direction and in the opposite direction.

Thus, it is desired to provide a device for preventing the recording button from being actuated regardless of the direction of feeding of the tape insofar as the actuating lever senses the detecting portion having no lug indicating that the erasion of the tape is inhibited.

The prior art device for preventing inadvertent erasion of the tape in a bi-directionally operable recording/reproducing apparatus is very complicated in construction and, hence, is very expensive.

The present invention aims at avoiding the disadvantages in the prior art device of the type described above.

SUMMARY OF THE INVENTION

An object of the present invention is to provide a novel and useful device for preventing the inadvertent erasure of the tape in a bi-directionally operable recording/reproducing apparatus which is simple in construction and inexpensive to manufacture while the accurate and steady operation is insured.

The above object is achieved in accordance with the characteristic feature of the present invention by providing a device for preventing the inadvertent erasure of the information recorded on a tape in a tape cassette loaded in a bi-directionally operable recording/reproducing apparatus having a recording button the actuation of which initiates the recording of the tape, the tape cassette having a pair of detecting portions each for the detection of whether or not erasure should be effected during the feeding of the tape in one direction and during the feeding of the tape in the opposite direction, each of the detecting portions having a removable lug therein the existence of which indicates that recording of the tape is allowed whereas the non-existence of the lug indicates that erasure of the record on the tape and new recording thereon are inhibited, the device being characterized by a pair of actuating levers pivotally mounted on the recording/reproducing apparatus and each urged into engagement with the respective detecting portion of the tape cassette so that the respective actuating lever is arrested to a first position when it is engaged with the detecting portion having a lug whereas it is moved to a second position when the actuating lever is engaged with the detecting portion without the lug, a recording switching plate slidably mounted on the recording/reproducing apparatus and moved to a first position when the tape in the tape cassette is fed in one direction while it is moved to a second position when the tape is fed in the opposite direction, the recording switching plate being operably coupled with the respective actuating levers so that either one or the other of the actuating levers, depending upon at which of the first or second position the recording switching plate is positioned, is urged and arrested to and at a position adjacent to the first position thereof thereby preventing the engagement thereof with the detecting portion of the tape cassette, and a recording preventing plate slidably mounted on the recording/reproducing apparatus and operably coupled with the recording button of the recording/reproducing apparatus so that the recording preventing plate is moved from a first position to a second position when the recording button is allowed to be actuated to the recording position, the recording preventing plate having a pair of abutment portions each being engageable with the respective actuating lever when the recording preventing plate is positioned in the first position and the respective actuating lever is positioned in the second position, thereby preventing the recording button from being actuated to the recording position insofar as either one of the actuating levers is positioned in the second position by virtue of the engagement of the abutment portion of the recording preventing plate with the actuating lever positioned in the second position.

With the above described construction of the device of the present invention, the erasure of the tape is positively prevented when the recording operation is intended to be commenced in either of the two directions of feeding of the tape insofar as both the detecting portions of the tape cassette have no lug.

However, if one of the detecting portions has a lug and the other of the detecting portions has no lug and when the recording operation is intended to be commenced by sensing the one of the detecting portions provided with the lug depending upon the direction of feeding of the tape, then the recording operation is allowed to be commenced and the recording operation will still continue when the direction of feeding of the tape is reversed despite the fact that the erasure or the recording operation of the tape in that reversed direction of feeding thereof must be stopped as indicated by the other detecting portion from which the lug is removed.

Thus, it is required to provide means for positively preventing the commencement of the erasure or the recording operation of the tape in the reversed direction of feeding of the tape after the recording operation in the feeding of the tape in one direction has been effected in case one of the detecting portions has a lug allowing the commencement of the recording operation whereas the other detecting portion has no lug inhibiting the erasure of the tape and the recording operation in one direction of feeding of the tape has been effected by sensing the detecting portion having a lug.

Such means is achieved in accordance with another feature of the present invention by providing a device for preventing inadvertent erasure of the information recorded on a tape in a tape cassette loaded in a bi-directionally operable recording/reproducing apparatus having an electric control circuit for the operation of the recording/reproducing apparatus and a recording button the actuation of which initiates the recording of the tape, the tape cassette having a pair of detecting portions for the detection of whether or not erasure should be effected during the feeding of the tape in one direction and during the feeding of the tape in the opposite direction, each of the detecting portions having a removable lug therein the existence of which indicates that recording of the tape is allowed to be effected whereas the nonexistence of the lug indicates that erasure of the record on the tape and new recording thereon are inhibited, the device comprising a pair of actuating levers each swingably mounted on the recording/reproducing apparatus and having swingably mounted thereon an auxiliary lever, each of the auxiliary levers having an upstanding bent sensing tip adapted to be engaged with the respective detecting portion of the tape cassette and urged into engagement with the detecting portion so that the auxiliary lever is swung to a first position when the detecting portion has the lug for indicating that recording of the tape is allowed while the auxiliary lever is swung to a second position for indicating that erasure of the tape is inhibited, each of the actuating levers being urged in the same direction as the auxiliary lever independently from the respective auxiliary lever, each of the auxiliary levers having a stopper engageable with the respective actuating lever so that, when the auxiliary lever is swung to its first position, the actuating lever is forced to be swung together with the auxiliary lever to a first position while, when the auxiliary lever is swung to its second position, the actuating lever is swung to a second position, a recording switching plate being movably mounted on the recording/reproducing apparatus and moved to a first position when the tape in the tape cassette is fed in one direction while it is moved to a second position when the tape is fed in the opposite direction, the recording switching plate being operably coupled with the respective actuating levers so that either one of the actuating levers, depending upon at which of the first and second positions the recording switching plate is positioned, is urged to the first position thereof from the second position and arrested in the first position while the other actuating lever is held in the second position, a recording preventing plate being movably mounted on the recording/reproducing plate and operably coupled with the recording button of the recording/reproducing apparatus so that the recording preventing plate is moved from a first position to a second position when the recording button is allowed to be actuated to the recording position, the recording preventing plate having a pair of abutment portions each engageable with the respective actuating lever when the recording preventing plate is positioned in its first position and the respective actuating lever is positioned in the second position thereof, thereby preventing the recording preventing plate from moving from its first position to its second position so that the recording button is prevented from being actuated to the recording position, and a pair of switches each cooperating with the respective auxiliary lever so that the switch is opened when the cooperating auxiliary lever is positioned in its second position while the switch is held closed when the cooperating auxiliary lever is positioned in its first position, the switches being connected to the electric control circuit of the recording/reproducing apparatus so that, when either one of the switches is opened, the electric control circuit is inactivated when the control circuit is switched to reverse the feeding of the tape so as to stop the operation of the recording/reproducing apparatus, thereby permitting erasure of the record on the tape to be positively prevented even after the erasure of the tape has been effected in the feeding of the tape in one direction by virtue of the respective auxiliary lever being capable of being swung independently of the actuating lever to sense the detecting portion without the lug therein so as to open the switch.

Thus, the undesired or inadvertent erasure of the tape is positively prevented regardless of the direction of feeding of the tape insofar as the lug is removed from the detecting portion by which the detection in the desired direction of feeding of the tape is given.

Preferred embodiments of the present invention will be described hereinbelow with reference to the accompanying drawings.

DETAILED DESCRIPTION OF THE PREFERRED EMBODIMENTS

Figure 1:
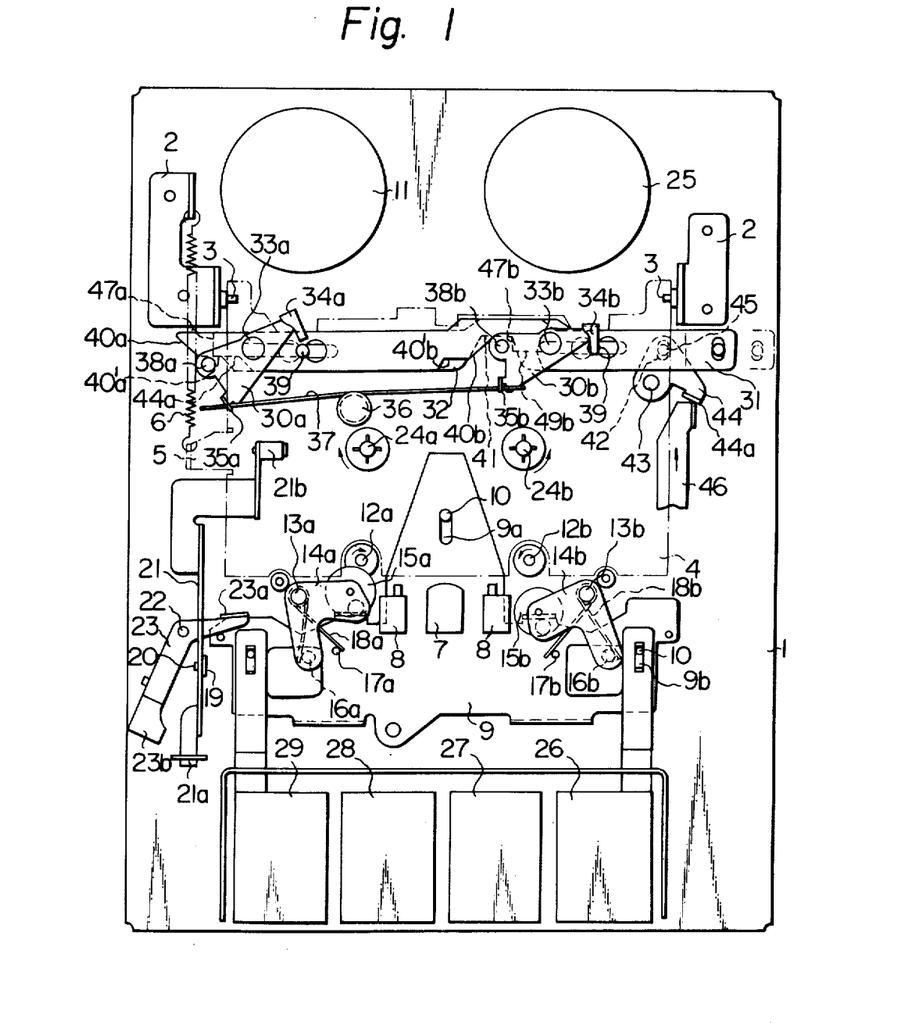
FIG. 1 is a general plan view showing an embodiment of the present invention.

Referring to FIG. 1 showing a bi-directionally operable magnetic recording/reproducing apparatus in which the present invention is incorporated, a chassis 1 has a pair of brackets 2 secured thereto having pivot shafts 3 fixed thereto, respectively. A tape cassette supporting plate 4 indicated by the chain dot line is swingably mounted about the pivot shafts 3. The tape cassette supporting plate 4 is urged by a spring 6 having one end thereof secured to the bracket 2 and the other end secured to a projection 5 formed in the cassette supporting plate 4 so that, when the cassette supporting plate 4 is swung downwardly, the plate 4 is urged by the spring 6 downwardly so as to positively hold the plate 4 in the operative position of the tape cassette loaded on the plate 4, while, when the cassette supporting plate 4 is swung upwardly, the plate 4 is urged upwardly by the spring 6 so as to facilitate the removal and reloading of a cassette on the plate 4.

A head base 9 having a recording/reproducing head 7 and a pair of erasing heads 8 mounted thereon is slidably mounted on the chassis 1 by the slidable engagement of guide pins 10 secured to the chassis 1 with elongated holes 9a, 9b formed in the head base 9 so that the heads 7, 8 can be moved between the operative position adjacent to the tape cassette loaded on the cassette supporting plate 4 and the inoperative position away from the tape cassette.

Either one of the erasing heads 8 is rendered to be operative and the recording/reproducing head 7 has its terminals switched for the operation in the set direction of the feeding of the tape depending upon the direction of the feeding of the tape as is well known in the art.

In order to feed the tape in the tape cassette, capstan shafts 12a and 12b are driven at a predetermined speed in the opposite directions as indicated by the arrows by a driving motor 11 through a transmission means (not shown).

A pair of L-shaped pinch roller supporting levers 14a, 14b are swingably mounted on pivot shafts 13a, 13b secured to the chassis 1 in a symmetrical relationship with respect to each other as shown, respectively. One arm of the respective lever 14a, 14b has a pinch roller 15a, 15b rotatably mounted thereon. The lever 14a is urged in the counter clockwise direction by a spring 18a provided around the pivot shaft 13a with one end of the spring 18a abutting against a pin 16a secured to the other arm of the lever 14a and the other end abutting against a pin 17a secured to the head base 9 so that the pinch roller 15a is urged against the capstan shaft 12a for feeding the tape sandwiched between the capstan shaft 12a and the pinch roller 15a toward the left as seen in FIG. 1.

In a similar manner, the lever 14b is urged in the clockwise direction by a spring 18b provided around the pivot shaft 13b with one end of the spring 18b abutting against a pin 16b secured to the other arm of the lever 14b and the other end abutting against a pin 17b secured to the head base 9 so that the pinch roller 15b is urged against the capstan shaft 12b for feeding the tape sandwiched between the capstan shaft 12b and the pinch roller 15b toward the right.

In order to move either one of the pinch rollers 15a, 15b away from the respective capstan shaft 12a, 12b so as to feed the tape in one of the two opposite directions, switching means is provided so as to urge the pin 16b, for example, toward the right as shown in FIG. 1 in coupled relationship with the actuation of a tape feeding reversing mechanism (not shown), thereby swinging the lever 14b in the counterclockwise direction against the action of the spring 18b so that the pinch roller 15b is moved away from the capstan shft 12b thus releasing the tape positioned therebetween. Thus, the tape is fed toward the left by the cooperation of the capstan shaft 12a and the pinch roller 15a. In a similar manner, the pin 16a is moved toward the left by the switching means so as to move the pinch roller 15a away from the capstan shaft 12a in coupled relationship with the actuation of the tape feeding reversing mechanism in the reversed direction while the pin 16b is released so that the lever 14b is swung in the clockwise direction by the action of the spring 18b thereby permitting the tape to be fed toward the right by the cooperation of the capstan shaft 12b and the pinch roller 15b.

In order to swing the cassette supporting plate 4 upwardly for allowing the cassette loaded thereon to be removed a lifting lever 21 is swingably mounted at its intermediate portion on a pin 20 secured to a bracket 19 which is fixed to the chassis 1, and one end of the lever 21 mounts thereon a roller 21b which is located beneath the cassette supporting plate 4 while the other end of the lever 21 has a knob 21a accessible to an operator. Thus, by depressing the knob 21a, the cassette supporting plate 4 is swung upwardly by the roller 21b against the action of the spring 6 and held in the lifted position also by the action of the spring 6.

If the lifting lever 21 is inadvertently actuated to lift the cassette supporting plate 4 when the head base 9 is positioned in the forwardly advanced operative position, the cassette loaded on the plate 4 or other elements might be damaged because the heads 7, 8 are engaged with the windows of the cassette in the operative position thereof. In order to prevent the occurrence of the above, an arresting lever 23 is provided which is swingably mounted at its intermediate portion on a pin 22 secured to the chassis 1, and is urged in the clockwise direction by a spring (not shown). A bent lug 23a formed at one end of the lever 23 is adapted to engage the front edge of the head base 9, while the other end 23b is adapted to move into a position beneath the lifting lever 21 adjacent to the knob 21a, when the lever 23 is swung in the counterclockwise direction against the action of the spring while the end 23b is held away from the lever 21 when the lever 23 is swung in the clockwise direction and held thereat. Therefore, when the head base 9 is advanced to the operative position of the heads 7, 8, the front edge of the head base 9 abuts against the bent lug 23a of the arresting lever 23 so that the lever 23 is swung in the counterclockwise direction so as to move the end 23b thereof beneath the lifting lever 21 thereby positively preventing the lifting lever 21 from being depressed for lifting the cassette supporting plate 4 so long as the head base 9 is in the forwardly advanced position. When the head base 9 is retracted to the inoperative position of the heads 7, 8, the bent lug 23a is released and the lever 23 is returned to the inoperative position disengaging the end 23b from the lifting lever 21 thereby permitting the lever 21 to be actuated for lifting the cassette supporting plate 4.

In order to take up the tape around either one of the two reels of the cassette depending upon the direction of feeding of the tape, either one of the take up shafts 24a, 24b fitted with the reels is driven by a motor 25 depending upon the direction of feeding of the tape through a transmission mechanism (not shown) as is well known in the art.

In order to operate the recording/reproducing apparatus in the various modes of operation, a recording button 26, a quick feeding button 27, a reproducing button 28 and a take up button 29 are arranged in the chassis 1 in the well known manner.

In accordance with the characteristic feature of the present invention, the erasure preventing device comprises a pair of actuating levers 30a, 30b, a recording switching plate 31 and a recording preventing plate 32 as the main elements thereof.

The actuating levers 30a, 30b are swingably mounted on pins 33a, 33b secured to the lower surface of the cassette supporting plate 4 and extend therefrom downwardly, respectively. Each of the actuating levers 30a, 30b is formed with a sensing portion 34a, 34b extending upwardly therefrom and having a bent sensing lug at the tip thereof.

Each of the sensing portions 34a, 34b is adapted to engage the respective recessed detecting portion provided in the tape cassette loaded on the cassette supporting plate 4. Each of the recessed detecting portions has a removable lug therein, and the existence of the lug in the detecting portion indicates that the erasure of the tape may be effected while the non-existence of the lug in the detecting portion indicates that erasure and recording of the tape is inhibited.

One of the detecting portions of the cassette is for the detection of the feeding of the tape in one direction while the other of the detecting portions is for the detection of the feeding of the tape in the opposite direction.

The actuating levers 30a, 30b have spring securing portions 35a, 35b, respectively, and the respective ends of a spring 37 provided around a pin 36 secured to the cassette supporting plate 4 are supported by the spring securing portions 35a, 35b of the levers 30a, 30b, respectively, so that both the actuating levers 30a, 30b are urged in the clockwise direction by the action of the spring 37 so as to urge the sensing portions 34a, 34b against the respective detecting portions of the cassette loaded on the cassette supporting plate 4. Thus, when the detecting portion has a lug, the actuating lever 30a, 30b is held at a first position (as indicated by the actuating lever 30a in FIG. 1) by the engagement of the sensing portion with the lug indicating that the erasure of the tape may be effected, whereas, when the sensing portion engages the detecting portion without a lug, the actuating lever 30a, 30b is swung to a second position (as indicated by the actuating lever 30b in FIG. 1) indicating that the erasure of the tape is inhibited.

Each of the actuating levers 30a, 30b is provided with a pin 38a, 38b extending therefrom downwardly which is adapted to cooperate with the recording switching plate 31 and the recording preventing plate 32 is described below.

Figure 2:
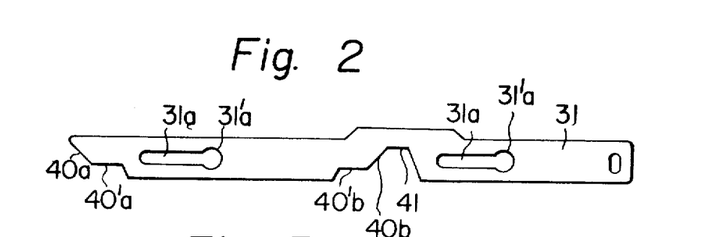
FIG. 2 is a plan view showing the configuration of the recording switching plate incorporated in the apparatus shown in FIG. 1.

The recording switching plate 31 is formed with a pair of elongated holes 31a in alignment with each other as shown in FIG. 2. A pair of guide pins 39 are secured to the chassis 1 and the guide pins are slidably engaged within the elongated holes 31a of the recording switching plate 31 so that the plate 31 is movable between a first position (the right end indicated by the solid line in FIG. 1) and a second position (the right end indicated by the chain dot line). The recording switching plate 31 is moved to the first position in coupled relation with the actuation of the tape feeding switching mechanism depending upon the direction of the feeding of the tape while the plate 31 is moved to the second position by the tape feeding switching mechanism when the direction of feeding of the tape is reversed.

As is best seen in FIG. 2, the recording switching plate 31 is also formed with a cam surface 40a and a cam surface 40'a therebeneath at the left end thereof which are adapted to cooperate with the pin 38a of the actuating lever 30a and a recessed portion 41 in the intermediate portion thereof in which a cam surface 40b and a cam surface 40'b therebeneath are formed for cooperating with the pin 38b of the actuating lever 30b.

Thus, when the recording switching plate 31 is moved to the first position, for example, depending upon the direction of feeding of the tape, the cam surface 40a urges the pin 38a downwardly and the pin 38a is held threreat by the cam surface 40'a so that the actuating lever 30a is swung in the counterclockwise direction into a position adjacent to the first position thereof in which the sensing portion 34a is held disengaged from the detecting portion of the cassette. In this position, the pin 38b of the actuating lever 30b is freely located in the recessed portion 41 of the lever 31 disengaged from the cam surfaces 40b, 40'b, thereby permitting the sensing portion 34b to engage with the detecting portion so that the actuating lever 30b is positioned in the first position or in the second position depending upon the existence and the nonexistence of the lug in the detecting portion. When the recording switching plate 31 is in the second position, the actuation of the actuating levers 30a, 30b is reversed and the actuating lever 30a is operative to sense the detecting portion of the cassette while the actuating lever 30b is made inoperative by the engagement of the pin 38b with the cam surfaces 40b, 40'b.

As described above, by virtue of the provision of the recording switching plate 31, either one of the actuating levers 30a, 30b is made operative in sensing the detecting portion of the cassette depending upon the direction of feeding of the tape.

Figure 3:
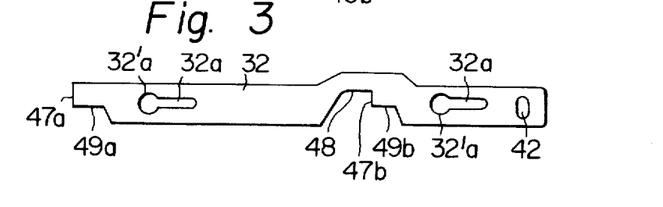
FIG. 3 is a plan view showing the configuration of the recording preventing plate incorporated in the apparatus shown in FIG. 1.

The recording preventing plate 32 is formed with a pair of elongated holes 32a similar to the elongated holes 31a of the recording switching plate 31, and the elongated holes 32a are slidably engaged with the guide pins 39.

The recording preventing plate 32 is located beneath the recording switching plate 31 either in sliding contact therewith or spaced therefrom by means of thin spacer pieces provided around the guide pins 39 between the two plates 31, 32.

The recording preventing plate 32 is also formed with an elongated hole 42 extending perpendicularly to the length of the plate 32 and a pin 45 secured to an L-shaped intermediate lever 44 swingably mounted on a pivot shaft 43 secured to the chassis 1 is slidably engaged within the elongated hole 42. The lever 44 is normally biased in the clockwise direction about the pivot shaft 43 by a spring (not shown) so as to urge the recording preventing plate 32 toward the right to a first position and has a bent portion 44a at the tip thereof which is operably engaged with one end of a recording lever 46 which is in turn operably connected to the recording button 26 so that, when the recording lever 46 is moved upwardly as seen in FIG. 1 by the actuation of the recording button 26, the lever 44 is swung in the counterclockwise direction against the action of the spring so that the recording preventing plate 32 is moved from the first position toward the left to a second position by the sliding engagement of the pin 45 with the elongated hole 42.

In other words, when the recording preventing plate 32 is allowed to be moved to the second position, the recording button 26 is allowed to be actuated to the recording position.

As shown in FIG. 3, the recording preventing plate 32 is formed with an abutment portion 47a and an escapement portion 49a therebeneath at the left end thereof for cooperating with the pin 38a of the actuating lever 30a and a recessed portion 48 in the intermediate portion thereof in which an abutment portion 47b and an escapement portion 49b therebeneath are formed for cooperating with the pin 38b of the actuating lever 30b.

The abutment portions 47a and 47b and the escapement portions 49a and 49b are so positioned that, when the recording preventing plate 32 is positioned in its first positioned by virtue of the recording button 26 not being actuated and eiter of the actuating levers 30a, 30b is positioned, depending upon the direction of feeding of the tape, in its second position (as shown by the actuating lever 30b in FIG. 1) by sensing the detecting portion of the cassette from which the lug is removed for indicating that erasure of the tape is inhibited, the pin 38a, 38b is brought to the position in which the pin abuts against the abutment portion 47a, 47b of the plate thereby preventing the recording preventing plate 32 from being moved from the first position to the second position so that the actuation of the recording button 26 is positively prevented. Which of the actuating levers 30a, 30b is brought to the operative position while the other is brought to the inoperative position is determined depending upon in which of the two directions the tape is to be initially fed.

The pin 38a, 38b of the actuating lever 30a, 30b held in the inoperative position is moved to a position disengaged from the abutment portion 47a, 47b of the plate 32 and held thereat by the cam surface 40'a, 40'b of the recording switching plate 31.

When the actuating lever 30a, 30b in the operative position senses the detecting portion having the lug and indicating that erasure and recording of the tape is allowed, then the actuating lever is held in the first position and the pin 38a, 38b is held apart from the abutment portion 47a, 47b of recording preventing plate 32 so that the plate 32 is allowed to be moved from the first position to the second position permitting the recording button 26 to be actuated to the recording position.

As shown in FIGS. 2 and 3, the elongated holes 31a, 32a of the respective plates 31, 32 have enlarged circular portions 31'a, 32'a at one end thereof, respectively. These enlarged portions 31'a, 32'a are slightly larger than the enlarged heads of the guide pins 39. Therefore, the assembly of the plates 31, 32 on the guide pins 39 is greatly facilitated by virtue of the fact that the plates 31, 32 can be assembled by merely passing the enlarged heads of the guide pins 39 through the enlarged portions 31'a, 32'a of the respective plates 31, 32 and sliding the plates 31, 32 in the operative positions while the guide pins 39 can be secured to the chassis 1 prior to the mounting of the levers 31, 32.

The enlarged portions 31'a, 32'a are naturally located out of the range of operation of the elongated holes 31a, 32a.

With the device described above, the inadvertent erasure is positively prevented regardless of the direction of feeding of the tape at the initial starting of operation of the recording/reproducing apparatus insofar as the cassette to be played with the recording/reproducing apparatus has the two detecting portions from both of which the lug is removed, while the erasure and recording of the tape is allowed in either of the directions of feeding of the tape at the initial starting of operation insofar as the cassette has two detecting portions having the lugs, respectively.

If the cassette has two detecting portions one of which has the lug while the other has no lug and when the recording of the tape is initiated in one direction of feeding of the tape by sensing the detecting portion having the lug, the erasure and the recording of the tape must be stopped when the direction of feeding of the tape is reversed.

Figure 4:
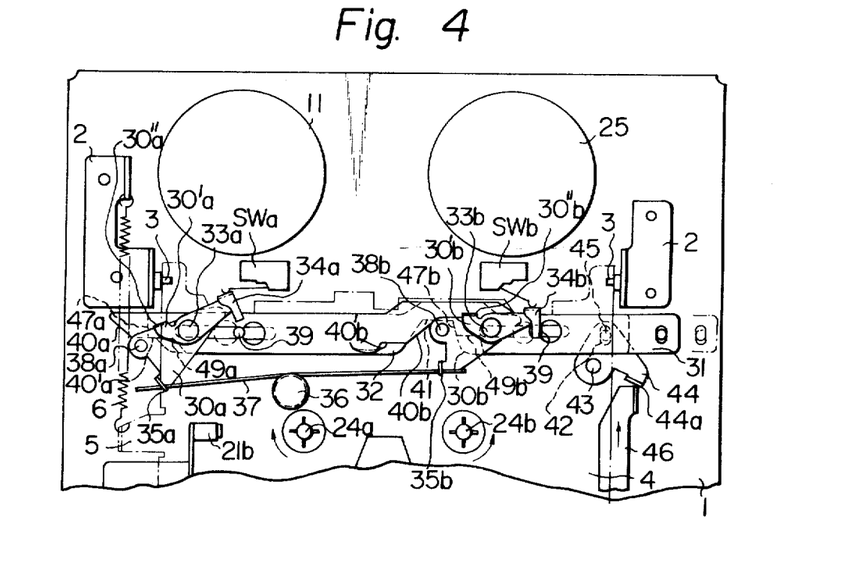
FIG. 4 is a fragmentary plan view showing a modification of the apparatus of FIG. 1.
Figure 5:
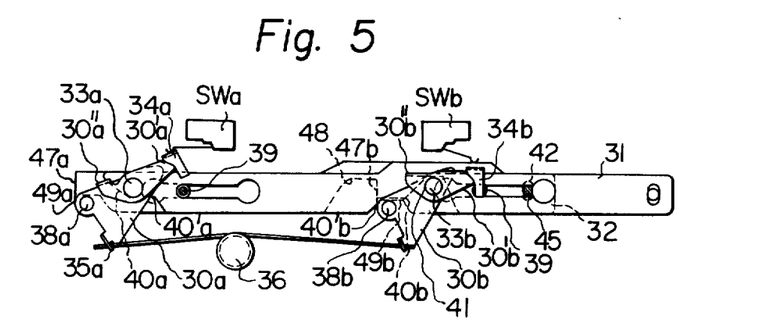
FIG. 5 is a plan view showing the operation of the recording switching plate and the recording preventing plate incorporated in FIG. 4.
Figure 6:
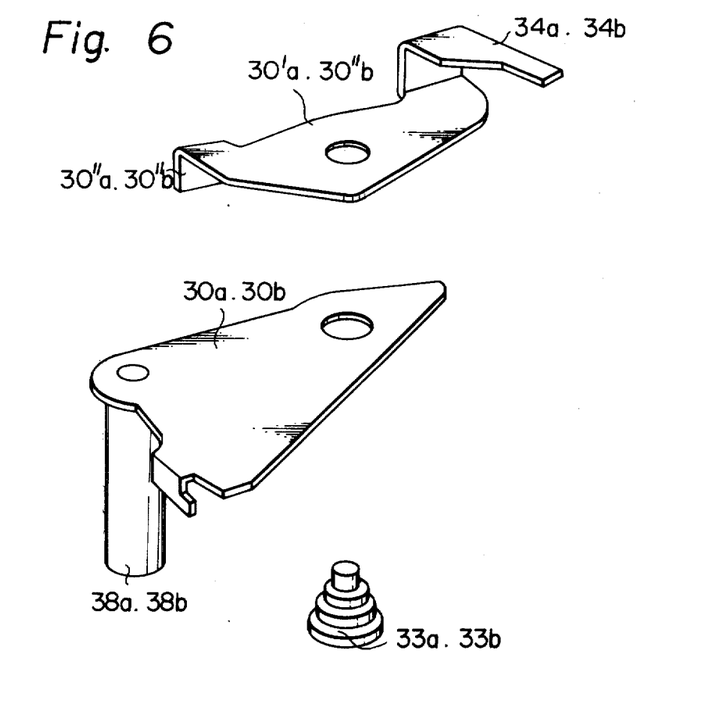
FIG. 6 is an exploded perspective view showing the construction of the actuating lever and the cooperating auxiliary lever incorporated in the apparatus shown in FIG. 4.

This is achieved by the embodiment of the present invention shown in FIGS. 4 and 5.

The embodiment shown in FIG. 4 is substantially similar to that of FIG. 1 except that the sensing portions 34a, 34b are removed from the actuating levers 30a, 30b of FIG. 1 and, instead, auxiliary levers 30'a, 30'b having the sensing portions 34a, 34b are pivotally mounted on the respective pivot shafts 33a, 33b above the respective actuating levers 30a, 30b respectively, and each of the auxiliary levers 30'a, 30'b is urged in the clockwise direction by a spring (not shown) independently of the respective actuating lever 30a, 30b, and switches SWa and SWb are located adjacent to the respective auxiliary levers 30'a, 30'b for cooperation therewith.

The auxiliary levers 30'a, 30'b have bent stopper portions 30''a, 30''b, respectively, so that, when the auxiliary levers 30'a, 30'b, are urged in the counterclockwise direction, the actuating levers 30a, 30b are also urged in the counterclockwise direction. Therefore, when the auxiliary lever senses the detecting portion of the cassette having the lug, the auxiliary lever is held at a position together with the actuating lever corresponding to the first position of the actuating lever shown in FIG. 1 so that it indicates that the erasure of the tape is allowed, whereas, when the auxiliary lever senses the detecting portion without the lug, the axuiliary lever is swung in the clockwise direction to a position corresponding to the second position of the actuating lever shown in FIG. 1 regardless of the position of the actuating lever whether or not it is urged in the counterclockwise direction by the engagement of the pin 38a, 38b with the cam portion 40a, 40b of the recording switching plate 31.

Each of the switches SWa, SWb is so connected to the electric control circuit of the recording/reproducing apparatus that, when the respective sensing portion 34a, 34b of the auxiliary lever 30'a, 30'b senses the detecting portion having the lug (as shown by the auxiliary lever 30'a in FIG. 5), the switch SWa is actuated so that the recording of the tape is allowed to continue, whereas when the sensing portion of the auxiliary lever senses the detecting portion without the lug (as shown by the auxiliary lever 30'b in FIG. 5), the switch SWb is opened so that the recording of the tape is automatically stopped when the direction of feeding of the tape is reversed by the control circuit even though the actuating lever itself is held in inoperative position as shown by the actuating lever 30b in FIG. 5.

In operation, when the recording of the tape is started in one direction of feeding of the tape by sensing the detecting portion having the lug as shown by the sensing portion 34a of the auxiliary lever 30'a shown in FIG. 5, for example, wherein the recording preventing plate 32 is allowed to move to the second position by virtue of the pin 38a of the actuating lever 30a being located out of the path of movement of the abutment portion 47a of the recording preventing plate 32 with pin 38b being held out of the path of movement of the abutment portion 47b by means of cam portion 40'b of the recording switching plate 31, the other sensing portion 34b senses the detecting portion without the lug so that it is held in a position opening the cooperating switch SWb independently of the actuating lever 30b held in the inoperative position. Therefore, when the direction of feeding of the tape is reversed, the erasing and recording operation is automatically stopped by the switch SWb.

The above operation also applies in the case in which the recording of the tape is initiated in the opposite direction of feeding of the tape by sensing the detecting portion having the lug by means of the sensing portion 34b of the auxiliary lever 30'b insofar as the sensing portion 34a senses the detecting portion without the lug.

I claim:

1. A device for preventing the inadvertent erasure of information recorded on a tape in a tape cassette loaded in a bi-directionally operable/reproducing apparatus having a recording button the actuation of which initiates the recording of the tape, said tape cassette having a pair of detecting portions each for the detection of whether or not erasure should be effected during the feeding of the tape in one direction and during the feeding of the tape in the opposite direction, each of said detecting portions having a removable lug therein, the existence of which indicates that recording of the tape is allowed to be effected whereas the non-existence of the lug indicates that erasure of the record on the tape and new recording thereon are inhibited, said device comprising:

a pair of actuating levers movably provided in said recording/reproducing apparatus and each urged into engagement with the respective detecting portion of said tape cassette so that the respective actuating lever is arrested at a first position when it is engaged with the detecting portion having said lug, whereas it is moved to a second position when the actuating lever is engaged with the detecting portion without the lug, a recording switching plate movably mounted on said recording/reproducing apparatus and moved to a first position when the tape in the tape cassette is fed in one direction while it is moved to a second position when the tape is fed in the opposite direction, said recording, said recording switching plate being operably coupled with the respective actuating levers so that either one or the other of said actuating levers, depending upon at which of said first and second positions and recording switching plate is positioned, is urged to and arrested at a position adjacent to said first position thereof preventing the engagement thereof with the detecting portion of said tape cassette, and a recording preventing plate movably on said recording/reproducing apparatus and operably coupled with said recording button of said recording/reproducing apparatus so that said recording preventing plate is moved from a first position to a second position when said recording button is allowed to be actuated to the recording position, said recording preventing plate having a pair of abutment portions each engageable with the respective actuating lever when said recording preventing plate is positioned in said first position and the respective actuating lever is positioned in said second position, thereby preventing said recording button from being actuated to the recording position insofar as either one of said actuating levers is positioned in said second position by virtue of the engagement of said abutment portion of said recording preventing plate with the actuating lever positioned in said second position.

2. Device according to claim 1, wherein said actuating levers are swingably mounted on a tape cassette supporting plate pivotally mounted on said recording/reproducing apparatus and have upstanding portion provided with sensing bent portions at their upper ends, respectively, each of said sensing bent portions being engaged with the respective detecting portion of the tape cassette loaded on said tape cassette supporting plate so that, when the detecting portion has no lug, the actuating lever is swung to said second position while, when the detecting portion has said lug, the actuating lever is held at said first position, said recording switching plate being slidably mounted on said recording/reproducing apparatus and having a pair of cam portions alternately engageable with the respective actuating levers depending upon said recording switching plate being positioned in said first position or said second position so that either one or the other of said actuating levers is swung to said position preventing the engagement of said sensing bent portion with the detecting portion of the tape cassette, said recording preventing plate being slidably mounted on said recording/reproducing apparatus and operably coupled with said recording button through lever means.

3. Device for preventing inadvertent erasion of the information recorded on a tape in a tape cassette loaded in a reciprocatingly operable recording/reproducing apparatus having an electric control circuit for the operation of the recording/reproducing apparatus and a recording button the actuation of which initiates the recording of the tape, said tape cassette having a pair of detecting portions each for the detection whether or not erasion should be effected during the feeding of the tape in one direction and during the feeding of the tape in the opposite direction, each of said detecting portions having a removable lug therein the existence of which indicates that recording of the tape is allowed to be effected whereas the non-existence of the lug indicates that erasure of the record on the tape and new recording thereon are inhibited, said device comprising a pair of actuating levers each swingably mounted on said recording/reproducing apparatus and swingably mounting thereon an auxiliary lever, each of said auxiliary levers having an upstanding bent sensing tip adapted to be engaged with the respective detecting portion of the tape cassette and urged into engagement with said detecting portion so that said auxiliary lever is swung to a first position when the detecting portion has said lug for indicating that recording of the tape is allowed while said auxiliary lever is swung to a second position for indicating that erasion of the tape is inhibited, each of said actuating levers being urged in the same direction as said auxiliary lever independently from the respective auxiliary lever, each of said auxiliary levers having a stopper engageable with the respective actuating lever so that, when the auxiliary lever is swung to said first position, the actuating lever is forced to be swung together with said auxiliary lever to a first position while, when said auxiliary lever is swung to said second position, said actuating lever is swung to a second position, a recording switching plate movably mounted on said recording/reproducing apparatus and moved to a first position when the tape in the tape cassette is fed in one direction while it is moved to a second position when the tape is fed in the opposite direction, said recording switching plate being operably coupled with the respective actuating levers so that either one of said actuating levers, depending upon at which of said first and second positions said recording switching plate is positioned, is urged to said first position from said second position and arrested in said first position while the other actuating lever is held in said second position, a recording preventing plate movably mounted on said recording/reproducing plate and operably coupled with said recording button of said recording/reproducing apparatus so that said recording preventing plate is moved from a first position to a second position when said recording button is allowed to be actuated to the recording position, said recording preventing plate having a pair of abutment portions each engageable with the respective actuating lever when said recording preventing plate is positioned in said first position and the respective actuating lever is positioned in said second position, thereby preventing said recording preventing plate from moving from said first position to said second position so that said recording button is prevented from being actuated to the recording position, and a pair of switches each cooperating with the respective auxiliary lever so that the switch is opened when the cooperating auxiliary lever is positioned in said second position while the switch is held closed when the cooperating auxiliary lever is positioned in said first position, said switches being connected to said electric control circuit of said recording/reproducing apparatus so that, when either one of said switches is opened, said electric control circuit is inactivated when said control circuit is switched to reverse the feeding of the tape so as to stop the operation of said recording/reproducing apparatus, thereby permitting erasion of the record on the tape to be positively prevented even after the erasion of the tape has been effected in the feeding of the tape in one direction by virtue of the respective auxiliary lever being capable of being swung independently of the actuating lever to sense the detecting portion without the lug therein so as to open said switch.

4. Device according to claim 3, wherein said actuating levers are swingably mounted together with said auxiliary levers on a tape cassette supporting plate pivotally mounted on said recording/reproducing apparatus and said recording switching plate is slidably mounted on said recording/reproducing apparatus and has a pair of cam portions alternately engageably with the respective actuating levers depending upon said recording switching plate being positioned in said first position or said second position so that either one of said actuating levers is swung to said first position allowing the movement of said recording preventing plate from said first position to said second position, said recording preventing plate being slidably mounted on said recording/reproducing apparatus and operably coupled with said recording button through lever means.

* * * * *